(12) United States Patent
Jambunathan et al.

(10) Patent No.: US 8,361,303 B2
(45) Date of Patent: Jan. 29, 2013

(54) ELECTRODES FOR ELECTROLYTIC GERMANE PROCESS

(75) Inventors: Krishnakumar Jambunathan, Breinigsville, PA (US); Kerry Renard Berger, Lehighton, PA (US); Reinaldo Mario Machado, Allentown, PA (US); Daniel James Ragsdale, Coopersburg, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 11 days.

(21) Appl. No.: 12/874,503

(22) Filed: Sep. 2, 2010

(65) Prior Publication Data
US 2012/0055803 A1 Mar. 8, 2012

(51) Int. Cl.
*C22B 9/00* (2006.01)
(52) U.S. Cl. .................................. 205/547; 205/464
(58) Field of Classification Search .............. 205/547, 205/464
See application file for complete search history.

(56) References Cited

U.S. PATENT DOCUMENTS

| | | | |
|---|---|---|---|
| 5,158,656 A | 10/1992 | Ayers | |
| 2009/0159454 A1* | 6/2009 | Machado et al. | 205/335 |

FOREIGN PATENT DOCUMENTS

| | | |
|---|---|---|
| RU | 2 071 993 C1 | 1/1997 |
| RU | 2 230 830 C1 | 6/2004 |
| SU | 1 732 697 A1 | 10/1995 |
| WO | 2005005673 A2 | 1/2005 |

OTHER PUBLICATIONS

Spasic, M., et al; "Mechanism of the Electrolytic Formation of Germanium Hydride"; Glasnik Hemuskog Drustva; vol. 28, No. 3-4; 1963; pp. 205-211.
Djurkovic, B.; "Current Effiency in the Process of Electrolytic Hydrogenation of Germanium"; Glasnik Hemuskog Drustva; vol. 27, No. 5-6; 1962; pp. 255-261.
Turygin, V., et al; "Electrochemical Preparation of Germane" Inorganic Chemistry Materials; vol. 44, No. 10; 2008; pp. 1081-1085.
Green, M., et al; "Kinetics of the Cathodic Reduction of Anions: Germanium Oxides"; Journal of the Electrochemical Society; vol. 106, No. 3;Mar. 1959; pp. 253-260.
Devyatykh, G., et al; "Electrochemical Synthesis of Ultrapure Germane"; 1988.
Spasic, M. et al; "Electroyitic Hydrogenation in Aqueous Solutions as a Method for Obtaining Very Pure Germanium"; pp. 469-475.

* cited by examiner

*Primary Examiner* — Arun S Phasge
(74) *Attorney, Agent, or Firm* — Lina Yang

(57) ABSTRACT

The invention relates to the electrolysis of aqueous electrolyte solutions containing $GeO_2$; hydroxide and water with metal alloy electrodes, such as, copper or tin rich alloy electrodes with alloying elements such as Sn, Pb, Zn, Cu etc, to generate Germane ($GeH_4$). Cu-rich alloy electrodes have been demonstrated to increase the $GeH_4$ current efficiency by almost 20% compared to Cu metal electrodes. Germanium deposition has been found to be either absent or minimal by using Cu-rich alloy electrodes. Several different methods for maintaining the cell performance or restoring the cell performance after a reduction in current efficiency over time, have been identified. A titration-based method for the analysis of the electrolyte, to obtain the concentration of $GeO_2$ and the concentration of hydroxide has also been disclosed.

20 Claims, 1 Drawing Sheet

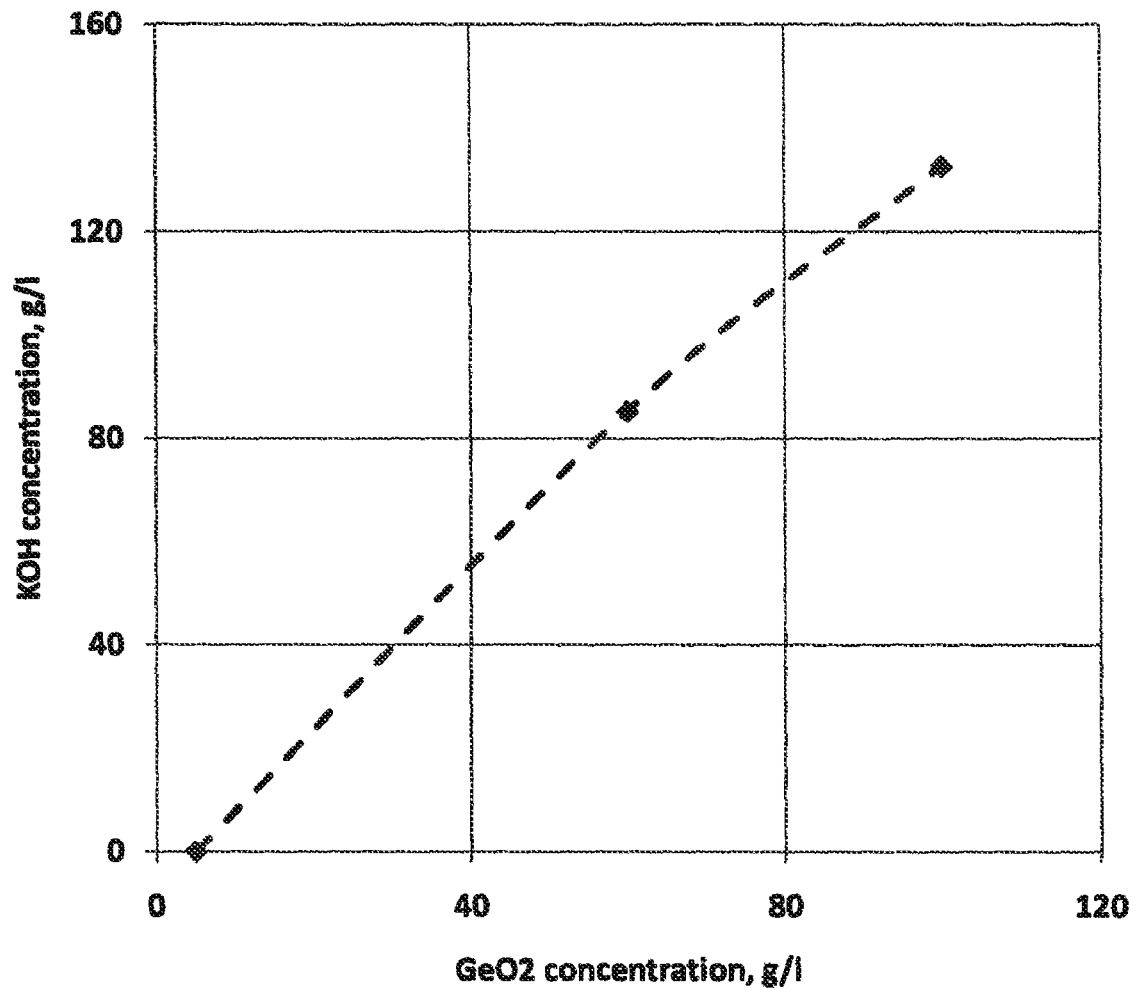

ELECTRODES FOR ELECTROLYTIC GERMANE PROCESS

BACKGROUND OF THE INVENTION

The present invention relates to electrode materials for the electrochemical synthesis of germane ($GeH_4$). Several electrode materials have been previously reported in literature, which include Ni, Cu, Pb, Sn, Cd, Zn, Pt, Al, Ge, Graphite, Fe and Hg.

SU1732697A1, RU2071993 and RU2230830 taught the use of a Ni electrode to electrochemically generate germane with current efficiencies estimated at 15-20% when operating at optimal conditions in a flow-through cell with cross mixing of anolyte and catholyte. The patents focused on the process of cross-mixing the anode and cathode electrolytes and not on, the electrode material itself.

U.S. Pat. No. 5,158,656 alleged the use of a germanium electrode to generate germane at current efficiencies of 30%. However, this result is in contrast to that reported in a journal publication (Green et. al., J. Electrochem. Soc., v106, n3, p253) which showed that germanium electrodes do not generate germane efficiently.

Djurkovic et. al. (Glanik Hem. Drustva, Beograd, v25/26 (8-10), 1961, p469) studied several different metals (Al, Fe, Pb, Cu, Zn and Hg) as electrodes.

Tomilov et. al. (Inorganic Materials, 2008, v44, n10, p1081) evaluated several different metals as electrodes in a filter-press electrolyzer with the catholyte circulated by a centrifugal pump and concluded that copper and cadmium were optimal electrode materials with current efficiencies of 32-34%. The authors' also reported that the current efficiencies decreased over a period of time due to the deposition of Germanium on the electrode surface.

Thus, there is still a need in the art to provide effective means for the electrochemical synthesis of germane, especially, with stable performance.

BRIEF SUMMARY OF THE INVENTION

The objective of the present invention is to provide effective means for the electrochemical synthesis of germane ($GeH_4$), especially, with stable performance.

In one embodiment, a method for generating germane in a divided tubular housing electrochemical cell; comprises the steps of:
  providing a cathode chamber comprising a metal alloy cathode, and the cathode gas outlet;
  providing an anode chamber comprising an anode that is part of inner wall of the tubular housing comprising metal $M_1$, and an anode gas outlet;
  providing an aqueous electrolyte solution comprising Germanium dioxide ($GeO_2$), a hydroxide $M_2OH$ and an electrolyte solvent in the cathode chamber and the anode chamber; wherein the metal alloy cathode and, the anode are at least partially immersed in the aqueous electrolyte solution;
  providing a divider separating the cathode chamber from the anode chamber; wherein the divider is electrically insulated from anode and cathode circuits;
  supplying an electric power to the divided electrochemical cell;
  releasing gas generated in the cathode chamber through the cathode gas outlet as the hydride gas; and
  releasing gas generated in the anode chamber through the anode gas outlet.

In another embodiment, a method for generating germane in a divided tubular housing electrochemical cell; comprises the steps of:
  providing a cathode chamber comprising a metal alloy cathode selected from the group consisting of copper alloy cathode, tin alloy cathode and combinations thereof, and the cathode gas outlet;
  providing an anode chamber comprising an anode that is part of inner wall of the tubular housing comprising nickel, and an anode gas outlet;
  providing an aqueous electrolyte solution comprising Germanium dioxide ($GeO_2$), KOH and DI water in the cathode chamber and the anode chamber; wherein the metal alloy cathode and the anode are at least partially immersed in the aqueous electrolyte solution;
  providing a divider separating the cathode chamber from the anode chamber; wherein the divider is electrically insulated from anode and cathode circuits;
  supplying an electric power to the divided electrochemical cell;
  releasing gas generated in the cathode chamber through the cathode gas outlet as the hydride gas; and
  releasing gas generated in the anode chamber through the anode gas outlet.

In yet another embodiment, a method for generating germane in a divided tubular housing electrochemical cell; comprises the steps of:
  providing a cathode chamber comprising a copper alloy cathode, and the cathode gas outlet;
  providing an anode chamber comprising an anode that is part of inner wall of the tubular housing comprising nickel, and an anode gas outlet;
  providing an aqueous electrolyte solution comprising KOH ranging from 80 to 170 g/l, germanium dioxide ($GeO_2$) ranging from 60-150 g/l and DI water in the cathode chamber and the anode chamber; wherein the copper alloy cathode and the anode are at least partially immersed in the aqueous electrolyte solution;
  providing a divider separating the cathode chamber from the anode chamber; wherein the divider is electrically insulated from anode and cathode circuits;
  supplying an electric power to the divided electrochemical cell;
  releasing gas generated in the cathode chamber through the cathode gas outlet as the hydride gas; and
  releasing gas generated in the anode chamber through the anode gas outlet.

The methods further comprise steps for maintaining the cell performance or restoring the cell performance after a reduction in current efficiency over time, by removing the cathode from the aqueous electrolyte solution and polishing the cathode, or suspending the cathode in gas phase over the aqueous electrolyte solution; and reinserting the cathode back to the aqueous electrolyte solution.

The methods further comprise steps for the analysis of the electrolyte, such as, obtaining the concentration of $GeO_2$ and the concentration of hydroxide by a titration-based method.

BRIEF DESCRIPTION OF SEVERAL VIEWS OF THE DRAWINGS

FIG. 1. Solubility curve for $GeO_2$ in aqueous KOH solution showing regions of preferred electrolyte concentrations for obtaining higher $GeH_4$ current efficiency.

DETAILED DESCRIPTION OF THE INVENTION

A new electrode material for the electrochemical synthesis of germane is disclosed in present invention.

More specifically, the present invention discloses the use of an alloy electrode for the manufacture of germane. This has been shown to result in an increase in the current efficiency for the formation of germane from an electrochemical cell by almost 20% with minimal or no accumulation of germanium deposits on the electrode surface.

A titration-based method for the analysis of the electrolyte is also disclosed in the present invention.

The electrochemical germane cell used in present invention, including an electrolyte, a cathode for generating $GeH_4$ and an anode electrode, is similar to the divided electrochemical cell described in US patent application 20090159454A1 (Machado et. al.) The disclosure of US patent application 20090159454A1 is hereby incorporated by reference into this specification.

The electrochemical cell is divided into an anode chamber and a cathode chamber by a solid partition in combination with a porous disphragm so that the $O_2$ gas generated at the anode and the hydride gas generated at the cathode do not mix. The gases exit via independent outlets in the gas phase of their respective chambers.

The method of operation involves controlling the differential pressure and differential level between the two chambers using a control value on the cathode gas outlet and/or anode gas outlet.

The electrochemical cell can be operated with the electrolyte continuously or periodically fed to the cathode chamber and drained from the anode chamber or vice versa. The electrochemical cell can also be operated with the anolyte and/or the catholyte fed to their respective chambers, either continuously or periodically as needed.

Germane ($GeH_4$) is synthesized by the electrolysis of Germanium dioxide ($GeO_2$) dissolved in $M_2OH$ containing aqueous solutions using an electrode, where $M_2OH$ is selected from the group consisting of KOH, NaOH, LiOH, CsOH, and combinations thereof.

In one embodiment, the electrolyte consists of $GeO_2$ and KOH dissolved in de-ionized water. KOH is present to increase the conductivity of the electrolyte and to facilitate the dissolution of $GeO_2$ in water. A person skilled in the art would know that other types of water, such as deuterated water, can also be used.

The KOH concentration is preferably in the range of 50 to 350 g/l and more preferably in the range of 80 to 170 V. The $GeO_2$ concentration is in the range of 30-150 g/l and more preferably in the range of 60-150 g/l. In solutions containing higher $GeO_2$ concentrations, KOH concentration may have to be higher because KOH increases the solubility of $GeO_2$.

As an example, the KOH concentration is 95 g/l and $GeO_2$ concentration is 60 g/l, or the KOH concentration is 145 g/l and $GeO_2$ concentration is 100 g/l.

FIG. 1 shows the solubility curve for $GeO_2$ in aqueous KOH solution. FIG. 1 indicates the preferred electrolyte concentrations for obtaining higher $GeH_4$ current efficiency.

It is preferable to have a minimally possible KOH concentration in the electrolyte for a certain $GeO_2$ concentration to achieve higher current efficiency. However, the optimal electrolyte concentration for germane manufacture by electrolysis may also depend upon the conductivity of the electrolyte (which contributes to the energy required to produce germane), the sustainability of the cell performance and process yields.

The anode material in the electrochemical germane cell is made up of materials such as Platinum, Copper or Nickel. In one embodiment, the wall of the electrochemical cell is made up of nickel which also acts as the anode at which oxygen is evolved from the electrolysis of water.

The cathode in the electrochemical cell is responsible for generating a gas mixture of $GeH_4$ and $H_2$. Several metal cathodes used for the generation of germane have been previously reported in literature, which include Ni, Cu, Pb, Sn, Cd, Zn, Th, Pt, Al, Fe and Hg. The use of Graphite and doped Ge as cathodes has also been reported. These different electrode materials have been shown to yield different amounts of $GeH_4$ in the product gas depending on the operating conditions as well as the relative activity of the electrode materials towards the formation of $H_2$ and the deposition and accumulation of Germanium.

In present invention, the cathode is a Cu rich or a Tin rich, Pb containing alloy electrode, preferably consisting of metals such as Sn, Zn, Cu etc. as alloying elements that are present in various proportions. The alloying elements are chosen based on their activity towards hydrogen evolution, which is known in the art. Elements that have lower activity towards the formation of $H_2$ from the electrolysis of water compared to Cu are preferable. If alloying elements that can potentially corrode are used, it is preferable to restrict its concentration below a certain level, which is also known in the art. For example, if Zn is used as an alloying element, it is preferable to have its concentration below 15 wt % to prevent possible dezincification in the alkaline electrolyte. The different elements in this alloy electrode may provide a synergistic benefit by increasing the formation of germane and decreasing the formation of $H_2$.

Examples for copper alloys include but not limited to the commercial available copper alloys from McMaster-Carr, such as, a bronze 936 alloy containing about 81% Cu, 12% Pb and about 7% Sn; a bronze 544 alloy containing about 89% Cu, 3% Zn, 4% Pb and 4% Sn; a bronze 932 alloy containing about 83% Cu, 3% Zn, 7% Pb, 7% Sn; and a bronze alloy 510 containing about 94% Cu, 5% Sn. Here the percentages are in wt %.

It is preferable to have both Cu and Pb present in the alloy electrode to achieve high current efficiencies.

The cathode can be made from a solid piece or from a hollow piece of the alloys of the present invention. The electrodes can also have a plurality of perforations, such as a porous structure with holes drilled through and/or may have patterns on the surface. The cathode can be cooled by making the cathode hollow and having a heat transfer fluid flow inside the hollow cathode via tubes.

At temperatures below 25° C., the current efficiency of $GeH_4$ decreases. The electrochemical cell consisting of the electrode material of the present invention is operated in the temperature range of 25-90° C., preferable to operate the cell between 25 and 65° C.

In some embodiments, it is more preferable to operate the cell between 25 and 45° C. to prevent the formation of germanium deposits at temperatures above 45 C.° while in other embodiments the electrochemical cell is operated at 60° C. without any formation of geranium deposits.

The optimal operating conditions that correspond to high $GeH_4$ current efficiency and minimal to no formation of germanium deposits will depend upon the alloy electrode chosen, the electrolyte concentration and operating current density.

The electrochemical cell is operated at current densities in the range of 50 to 500 mA $cm^{-2}$, preferably in the range of 250 to 350 mA $cm^{-2}$. At higher current densities, the current efficiency for germane was found to decrease. At lower current densities, the production rate is lowered due to lower applied current and a larger surface area will be required to achieve the target production.

The electrochemical cell is operated in a batch mode for several hours. The raw materials, $GeO_2$ and water, can be added periodically to the cell. The amount of water required can be based on a level indicator.

Formation of germanium deposits is detrimental for three reasons: 1) Germanium deposits can act as an electrode poison, reducing the $GeH_4$ current efficiency; 2) Raw material yields will be lower; 3) The germanium deposits could peel off from the electrode surface and form sludge in the electrolyte potentially causing operational problems.

The alloying metals when used individually were found to form Germanium deposits, but surprisingly, Cu alloys containing the metals did not form germanium deposits or the deposits were very minimal.

It was observed in the experiments of the present invention that the current efficiency for $GeH_4$ in the electrolytic process was not affected after re-start following brief or long term shutdowns when electrolytes contained minimally possible KOH concentrations. However, when higher KOH concentrations were used in order to increase the conductivity of the electrolyte, even though the current efficiency was stable during a continuous run, it was lower following a re-start after a brief or long shutdown.

Some solutions that help retrieve the performance or prevent the performance drop in the first place have been identified in present invention. It has been found that removing the electrode from the electrolytic cell and polishing it before reinserting it into the cell helps recover the performance. Surprisingly, it has also been found out that suspending the electrode in the gas phase over the electrolyte during a shutdown and reinserting it into the electrolyte when the cell is ready to be run would prevent the drop in performance. In addition, it has been found that using a hollow electrode with holes drilled through instead of a solid electrode would also prevent the performance drop following a re-start after a shutdown In order to determine the amount of $GeO_2$ in the electrolyte, a method based on titration can be used.

The solubility of $GeO_2$ in water is affected by pH (amount of KOH) in the solution. Decreasing the pH of the solution to between 9 and 10 with the addition of an acid such as HCl to the electrolyte solution will result in the precipitation of $GeO_2$. The solution can then be filtered, the weight of $GeO_2$ obtained and concentration of $GeO_2$ (g/l) can be calculated. The concentration of KOH can also be obtained by the titration method. Thus, this titration procedure can be used to determine the amount of $GeO_2$ in the electrolyte without the need for more expensive and tedious analytical techniques.

WORKING EXAMPLES

A cylindrical electrochemical cell made of Nickel (6.0" OD) was used for electrochemically generate $GeH_4$ at the cathode. A separator (3" ID) was used to divide the electrochemical cell into an anode chamber and a cathode chamber to prevent the cross mixing of the gases generated in the two chambers. The separator consisted of a 100 μm pore size diaphragm (a blend of HDPE and HDPP (Genpore)) that was welded to a solid HDPE tube. The Ni inner wall of the cylindrical cell acted as the anode at which oxygen gas was evolved from the electrolysis. A control valve on the anode gas oulet was used to control the differential pressure and the level difference between the anode and cathode chambers to further to prevent the cross mixing of the gases generated in the two chambers.

A diethylene glycol coolant jacket on the outside of the electrochemical cell was used to maintain the temperature of the cell.

A bronze 936 alloy containing about 81% Cu, 12% Pb and about 7% Sn; and a bronze 544 alloy containing about 89% Cu, 3% Zn, 4% Pb and 4% Sn; and a bronze 932 alloy containing about 83% Cu, 3% Zn, 7% Pb, 7% Sn; and a bronze alloy 510 containing about 94% Cu, 5% Sn have been purchased from McMaster-Carr to be used as the cathode to generate $GeH_4$.

Examples 1-3 below demonstrated the improvement in performance of an electrochemical germane cell when electrodes of the present invention have been used.

Example 1

The electrolyte contained 145 g/l KOH and 100 g/l $GeO_2$ dissolved in de-ionized water.

A bronze 936 alloy was used as the cathode to generate $GeH_4$. The 936 alloy electrode was a 0.25" diameter rod with an active surface area of 15 $cm^2$.

A current of 5 A corresponding to a current density of 330 $mA\ cm^{-2}$ was applied to the cell. The cell was operated for at least 4 hours and up to 9 hours each day for several days.

The electrolyte temperature was maintained at 30° C. using a diethylene glycol coolant jacket on the outside of the electrochemica cell.

A Piezocon® gas concentration sensor from Lorex Industries, Inc. was used to obtain the concentrations of $GeH_4$ and $H_2$ in the product gas. The molar $GeH_4$ concentration in the product gas was 16.2% corresponding to a current efficiency of 43.6%.

The electrolyte was not replenished with the raw material during the runs.

Example 2

Experiments similar to the one described in example 1 was carried out, however a bronze alloy 544 was used as the cathode.

The $GeH_4$ concentration in the product gas on was 14.7% corresponding to a current efficiency of 40.8%.

Comparative Example 3

Experiment similar to the one described in example 1 was carried out, however copper was used as the cathode.

The $GeH_4$ concentration in the product gas was 12.6% corresponding to a current efficiency of 36.6%.

TABLE 1

% $GeH_4$ in the cathode gas and the current efficiency for $GeH_4$ formation in an aqueous electrolyte containing 145 g/l KOH and 100 g/l $GeO_2$ at 330 $mA\ cm^{-2}$ and 30 C.

| Example | Cathode | % $GeH_4$ | $GeH_4$ current Efficiency (%) |
|---------|---------|-----------|-------------------------------|
| 1 | 936 | 16.2 | 43.6 |
| 2 | 544 | 14.7 | 40.8 |
| 3 | Cu | 12.6 | 36.6 |

Examples 4-6 below illustrated the effect of current density on $GeH_4$ concentration in the product gas.

Example 4

Experiment similar to that described in example 1 was carried out in electrolyte containing 95 g/lKOH and 45 g/l GeO$_2$ dissolved in de-ionized water at 330 mA cm$^2$. Bronze alloy 936 was used as the electrode.

The GeH$_4$ concentration in the product gas was 10.7%.

Example 5

Experiment similar to that described in example 4 was carried out but at a lower current density of 250 mA cm$^{-2}$.

The GeH$_4$ concentration in the product gas was 10.7%.

Example 6

Experiment similar to, that described in example 4 was carried out but at a higher current density of 500 mA cm$^{-2}$.

The GeH$_4$ concentration in the product gas was 9.5%.

TABLE 2

GeH$_4$ concentration in the cathode gas during electrolysis in an aqueous electrolyte containing 95 g/l KOH and 45 g/l GeO$_2$ at current densities between 250-500 mA cm$^{-2}$.

| Example | Current Density, mA cm$^{-2}$ | % GeH$_4$ | GeH$_4$ Current Efficiency % |
|---|---|---|---|
| 4 | 3.75 | 10.7 | 32.4 |
| 5 | 5 | 10.7 | 32.4 |
| 6 | 7.5 | 9.1 | 28.6 |

Examples 7-10 below illustrated the effect of KOH and GeO$_2$ concentrations on % GeH4 produced using bronze alloy 936 as the cathode.

Example 7

Experiment similar to that described in example 1 was carried out in electrolyte containing 95 g/l KOH and 60 g/l GeO$_2$ dissolved in de-ionized water at 330 mA cm$^{-2}$. The GeH$_4$ concentration in the product gas was 12%.

Example 8

Experiment similar to that described in example 1 was carried out in electrolyte containing 263 g/l KOH and 60 g/l GeO$_2$ dissolved in de-ionized water at 330 mA cm$^{-2}$. The GeH$_4$ concentration in the product gas was 5.5%.

Example 9

Experiment similar to that described in example 1 was carried out in electrolyte containing 196 g/l KOH and 42 g/l GeO$_2$ dissolved in de-ionized water at 330 mA cm$^{-2}$. The GeH$_4$ concentration in the product gas was 7.5%.

Example 10

Experiment similar to that described in example 1 was carried out in electrolyte containing 196 g/l KOH and 56 g/l GeO$_2$ dissolved in de-ionized water at 330 mA cm$^{-2}$.

The GeH$_4$ concentration in the product gas was 8.1%.

TABLE 3

GeH$_4$ concentration in the cathode gas during electrolysis in an aqueous electrolyte containing different concentrations of KOH and GeO$_2$ at a current density of 330 mA cm$^{-2}$.

| Example | KOH, g/l | GeO$_2$, g/l | % GeH$_4$ | GeH$_4$ Current Efficiency, % |
|---|---|---|---|---|
| 7 | 95 | 60 | 12 | 35.3 |
| 8 | 263 | 60 | 5.5 | 18.9 |
| 5 | 95 | 45 | 10.7 | 32.4 |
| 10 | 196 | 45 | 7.5 | 24.5 |
| 10 | 196 | 56 | 8.1 | 26.1 |

Examples 11-12 below illustrated the effect of temperature on the generation of GeH$_4$ using the bronze alloy 936 as the cathode Example 11

Experiment similar to that described in example 4 was carried out but at a lower temperature of 20 C. The GeH$_4$ concentration in the product gas was 6%.

Example 12

Experiment similar to that described in example 7 was carried out but at a higher temperature of 45 C. The GeH$_4$ concentration in the product gas was 12.3%.

TABLE 4

GeH$_4$ concentration in the cathode gas during electrolysis in an aqueous electrolyte containing KOH and GeO$_2$ at a current density of 330 mA cm$^{-2}$ and at different temperatures.

| Example | KOH, g/l | GeO$_2$, g/l | Temperature, C. | % GeH$_4$ | GeH$_4$ Current Efficiency, % |
|---|---|---|---|---|---|
| 4 | 95 | 45 | 30 | 10.7 | 32.4 |
| 11 | 95 | 45 | 20 | 6 | 20.3 |
| 7 | 95 | 60 | 30 | 12 | 35.3 |
| 12 | 95 | 60 | 45 | 12.3 | 35.9 |

Examples below 13-20 illustrated the performance of different metals and alloys as electrodes to generate GeH$_4$.

Example 13

Experiment similar to that described in example 1 was carried out in electrolyte containing 196 g/l KOH and 45 g/l GeO$_2$ dissolved in de-ionized water. Alloy 936 was used as the cathode. A current of 5 A was applied to the cell and the GeH$_4$ concentration in the product gas was 7.2% at 30 C. There was no formation of germanium deposits on the electrode surface.

Example 14

Experiment similar to that described in example 13 was carried out with bronze alloy 932 as the cathode. The GeH$_4$ concentration was 4.1% at 30 C and 7% at 60 C. There was no formation of germanium deposits on the electrode surface.

Comparative Example 15

Experiment similar to that described in example 13 was, carried out with Sri as the cathode. The $GeH_4$ concentration was 9.8%. However, a significant amount of germanium deposits were formed on the electrode surface.

Comparative Example 16

Experiment similar to that described in example 13 was carried out with Pb as the cathode. The $GeH_4$ concentration in the product gas was 1.9% at 30 C and 60 C. A significant amount of germanium deposits were formed on the electrode surface.

Comparative Example 17

Experiment similar to that described in example 13 was carried out with Cu as the cathode. The GeRt concentration in the product gas was 8.5% at 30 C. There was no formation of germanium deposits on the electrode surface.

Comparative Example 18

Experiment similar to that described in example 13 was carried out with Ni as the cathode. The $GeH_4$ concentration on was 6.0% at 30 C without the formation of significant amounts of germanium deposits.

Comparative Example 19

Experiment similar to that described in example 13 was carried out with Monel, (~70% Ni, ~30% Cu) as the cathode. The $GeH_4$ concentration was 3.5% at 30° C. and 7% at 60° C. respectively. A significant amount of germanium deposits was observed on the electrode surface.

Comparative Example 20

Experiment similar to that described in example 13 was carried out with bronze alloy 510 used as the cathode. The $GeH_4$ concentration was 3.8% at 30 C and 6.1% at 60 C. A significant amount of germanium deposits was observed on the electrode surface.

TABLE 5

$GeH_4$ concentration in the cathode gas during electrolysis at 330 mA $cm^{-2}$ with different metals and alloys as electrodes.

| Example | Electrode | % GeH4 | $GeH_4$ Current Efficiency | Deposits of Germanium |
|---|---|---|---|---|
| 13 | 936 | 7 (30 C.) | 23.1 | no |
| 14 | 932 | 4.1 (30 C.)/7 (60 C.) | 14.6/23.1 | no |
| 15 | Sn | 9.8 (30 C.) | 30.3 | yes |
| 16 | Pb | 1.9 (30 & 60 C.) | 7.2 | yes |
| 17 | Cu | 8.5 (30 C.) | 27.1 | no |
| 18 | Ni | 6 (30 C.) | 20.3 | no |
| 19 | Monel | 3.5 (30 C.)/7 (60 C.) | 12.7/23.1 | yes |
| 20 | 510 | 3.8 (30 C.)/6 (60 C.) | 13.6/20.3 | yes |

Examples 21-26 below illustrated the different methods to restore the performance of the $GeH_4$ electrochemical cell.

Comparative Example 21

Experiment similar to that described in example 1 was carried out in electrolyte containing 196 µl KOH and 56 g/l $GeO_2$ dissolved in de-ionized water. Bronze alloy 936 was used as the cathode. A current of 5 A was applied to the cell. The $GeH_4$ concentration on day 1 was 8%. The cell was shutdown overnight and re-started the following day. The $GeH_4$ concentration on day 2 was 6%, on day 3 was 4% and day 4 was 3%.

Example 22

Experiment similar to that described in comparative example 21 was carried out in electrolyte containing 196 g/l KOH and 56 g/l $GeO_2$ dissolved in de-ionized water. Bronze alloy 936 was the cathode. After the end of day 4 of experiments, the electrode was taken out of the cell and polished with polishing cloth, rinsed and re-inserted into the cell. The $GeH_4$ concentration in the product gas increased to 8% following polishing.

Example 23

Experiment similar to that described in example 21 was carried out in electrolyte containing lower concentration of KOH (95 g/l) and 60 g/l $GeO_2$ dissolved in de-ionized water. The $GeH_4$ concentration on day 1 was 8% The cell was shutdown overnight and re-started the following day. The $GeH_4$ concentration on day 2 was 12° A) and day 3 was 11% and on day 4 was 11.4%.

Comparative Example 24

Experiment similar to that described in comparative example 21 was carried out in electrolyte containing 185 g/l KOH and 37 g/l $GeO_2$ dissolved in de-ionized water. There was almost a 50% decrease in $GeH_4$ concentration in the product gas on day 2.

Example 25

Experiment similar to that described in comparative example 24 was carried out in electrolyte containing 185 g/l KOH and 37 g/l $GeO_2$ dissolved in de-ionized water. Following operation of the cell on day 1, the cell was shutdown and the cell head space was briefly purged with Helium. The electrode was then lifted out of the electrolyte and kept above the electrolyte in the cell until the cell was run the following day. There was only a 4% decrease in $GeH_4$ concentration in the product gas on day 2.

Example 26

Experiment similar to that described in comparative example 21 was carried out in electrolyte containing 235 g/l KOH and 71 g/l $GeO_2$ dissolved in de-ionized water. A 0.5" OD and 0.48" ID hollow tube of Alloy 936 with 1 mm holes was used as the cathode. A current of 10 A was applied to cell corresponding to a current density of 330 mA $cm^{-2}$. The $GeH_4$ concentration did not decrease after 3 days of operation.

TABLE 6

Comparison of different methods to restore or maintain the performance of the germane electrolytic cell. The table shows $GeH_4$ current efficiencies on different days following overnight shutdowns.

| Example | Process | Day 1 | Day 2 | Day 3 | Day 4 | Day 5 |
|---|---|---|---|---|---|---|
| 21 & 22 | Effect of polishing (after day 4) | 8 | 6 | 4 | 3 | 8 |
| 23 | Lower KOH concentration | 8 | 12 | 11 | — | — |
| 25 | Electrode above the electrolyte | 8 | 7.7 | 7.7 | — | — |
| 26 | Electrode with holes | 6 | 6 | 6 | — | — |

Example 27 below illustrates the titration method to obtain $GeO_2$ concentration.

Example 27

34 cc of 1.2 N HCl solution was added to 10 cc of aqueous electrolyte solution containing $GeO_2$ and KOH. The pH of the resulting solution after the addition of the acid was 9.5. The $GeO_2$ in the solution precipitated out and it was filtered and weighed. Based on the weight of the $GeO_2$, it was determined that the electrolyte consisted of 103.6 g/l of $GeO_2$. It was also determined that the electrolyte solution contained 168 g/l KOH after titrating the electrolyte solution to a pH of 7. The concentrations that were determined by titration were almost identical to that obtained using inductively coupled plasma mass spectrometry which showed that the electrolyte contained 103.1 g/l of $GeO_2$ and 168 g/l KOH.

In summary, a new electrode material for the electrochemical synthesis of germane has been disclosed herein.

Copper rich alloys containing other alloying elements such as Pb, Sn, Zn etc. were found to be better electrodes compared to metals for the generation of $GeH_4$ via electrolysis of aqueous solutions containing $GeO_2$ and KOH. When those copper rich alloys were used in an electrolytic germane cell, the germane current efficiencies of over 40% with stable performance for several hours were achieved.

The highest current efficiency of ~44% was observed when 936 alloy (~81% Cu, 12% Pb and ~7 Sn) was used as the electrode in an aqueous electrolyte containing 145 g/l KOH and 100 g/l $GeO_2$ when operated at 30° C. at a current density of 330 mA $cm^{-2}$.

The optimal electrode should not only provide high $GeH_4$ current efficiencies but also result minimal formation of Germanium deposits. The new alloy electrode(s) of the present invention has been shown to have high current efficiency for $GeH_4$ formation in an electrolytic $GeH_4$ cell with minimal or no formation of germanium deposits on the electrode surface when operated under the preferred conditions.

Comparing with electrodes containing copper and cadmium (Tomilov et. al. Inorganic Materials, 2008, v44, n10, p1081), a 20% improvement in current efficiency for $GeH_4$ formation was observed with these new electrodes of alloys of copper.

It was determined that the performance of the electrochemical cell improved significantly when operating at lower KOH concentrations and higher $GeO_2$ concentrations. Preferred operating conditions for higher $GeH_4$ current efficiency (temperature, KOH and $GeO_2$ concentrations, current density) have also been disclosed in present invention.

Furthermore, several different methods to for maintaining the cell performance or restoring the cell performance after a reduction in current efficiency over time, were identified.

A titration-based method for the analysis of the electrolyte, such as, to obtain the concentration of $GeO_2$ and KOH has also been disclosed.

The foregoing examples and description of the embodiments should be taken as illustrating, rather than as limiting the present invention as defined by the claims. As will be readily appreciated, numerous variations and combinations of the features set forth above can be utilized without departing, from the present invention as set forth in the claims. Such variations are intended to be included within the scope of the following claims.

The invention claimed is:

1. A method for generating germane in a divided tubular housing electrochemical cell; comprising the steps of:
    providing a cathode chamber comprising a metal alloy cathode, and cathode gas outlet;
    providing an anode chamber comprising an anode that is part of inner wall of the tubular housing comprising metal $M_1$, and an anode gas outlet;
    providing an aqueous electrolyte solution comprising Germanium dioxide ($GeO_2$), a hydroxide $M_2OH$ and an electrolyte solvent in the cathode chamber and the anode chamber; wherein the metal alloy cathode and the anode are at least partially immersed in the aqueous electrolyte solution;
    providing a divider separating the cathode chamber from the anode chamber; wherein the divider is electrically insulated from anode and cathode circuits;
    supplying an electric power to the divided electrochemical cell;
    releasing gas generated in the cathode chamber through the cathode gas outlet as the hydride gas; and
    releasing gas generated in the anode chamber through the anode gas outlet;
    wherein the metal alloy is selected from the group consisting of copper alloy, tin alloy and combinations thereof.

2. The method of claim 1, wherein $M_1$ is a metal or a metal alloy suitable for anodic oxygen generation selected from the group consisting of nickel, platinum, copper, and combinations thereof; and the $M_2OH$ is selected from the group consisting of KOH, NaOH, LiOH, CsOH, and combinations thereof.

3. The method of claim 1, wherein the metal alloy is a copper alloy comprising >60% copper (Cu), and lead(Pb).

4. The method of claim 3, wherein the copper alloy further comprising tin(Sn) and zinc (Zn); and Zn is <15%.

5. The method of claim 1 wherein the electrolyte solvent is selected from the group consisting of de-ionized(DI) water, deuterated water ($D_2O$), and mixtures thereof.

6. The method of claim 1, wherein $GeO_2$ in the aqueous electrolyte solution ranges about 30 to 150 g/l, and $M_2OH$ in the aqueous electrolyte solution ranges about 50 to 350 g/l.

7. The method of claim 6, wherein concentration of $GeO_2$ is determined by weighing $GeO_2$ precipitation generated through adding acid to the aqueous electrolyte solution to decrease pH to between 9 and 10.

8. The method of claim 1, wherein the divided tubular housing electrochemical cell is operated at a temperature ranging from $25°C$ to $90°C$, and at a current density ranging from 250 mA/cm$^2$ to 350 mA/cm$^2$.

9. The method of claim 1, wherein the metal alloy cathode is a hollow cathode or a metal alloy cathode comprising a plurality of perforations.

10. The method of claim 1, further comprising steps of:
suspending the cathode in gas phase over the aqueous electrolyte solution; and
reinserting the cathode back to the aqueous electrolyte solution.

11. A method for generating germane in a divided tubular housing electrochemical cell; comprising the steps of:
providing a cathode chamber comprising a copper alloy cathode, and a cathode gas outlet;
providing an anode chamber comprising an anode that is part of inner wall of the tubular housing comprising nickel, and an anode gas outlet;
providing an aqueous electrolyte solution comprising Germanium dioxide (GeO$_2$), KOH and DI water in the cathode chamber and the anode chamber; wherein the metal alloy cathode and the anode are at least partially immersed in the aqueous electrolyte solution;
providing a divider separating the cathode chamber from the anode chamber; wherein the divider is electrically insulated from anode and cathode circuits;
supplying an electric power to the divided electrochemical cell;
releasing gas generated in the cathode chamber through the cathode gas outlet as the hydride gas; and
releasing gas generated in the anode chamber through the anode gas outlet.

12. The method of claim 11, wherein the copper alloy comprising >60% copper (Cu), and lead(Pb).

13. The method of claim 12, wherein the copper alloy further comprising tin(Sn) and zinc (Zn); and Zn is <15%.

14. The method of claim 11, wherein GeO$_2$ in the aqueous electrolyte solution ranges about 30 to 150 g/l, and KOH in the aqueous electrolyte solution ranges about 50 to 350 g/l.

15. The method of claim 14, wherein concentrations of GeO$_2$ is determined by weighing GeO$_2$ precipitation generated through adding acid to the aqueous electrolyte solution to decrease pH to between 9 and 10.

16. The method of claim 11, wherein the divided tubular housing electrochemical cell is operated at a temperature ranging from 25° C. to 90° C., and at a current density range of 250 mA/cm$^2$ to 350 mA/cm$^2$.

17. The method of claim 11, further comprising steps of :
suspending the cathode in gas phase over the aqueous electrolyte solution; and
reinserting the cathode back to the aqueous electrolyte solution.

18. A method for generating germane in a divided tubular housing electrochemical cell; comprising the steps of:
providing a cathode chamber comprising a copper alloy cathode, and the cathode gas outlet;
providing an anode chamber comprising an anode that is part of inner wall of the tubular housing comprising nickel, and an anode gas outlet;
providing an aqueous electrolyte solution comprising KOH ranging from 80 to 170 g/l, germanium dioxide (GeO$_2$) ranging from 60-150 g/l and DI water in the cathode chamber and the anode chamber; wherein the copper alloy cathode and the anode are at least partially immersed in the aqueous electrolyte solution;
providing a divider separating the cathode chamber from the anode chamber; wherein the divider is electrically insulated from anode and cathode circuits;
supplying an electric power to the divided electrochemical cell;
releasing gas generated in the cathode chamber through the cathode gas outlet as the hydride gas; and
releasing gas generated in the anode chamber through the anode gas outlet.

19. The method of claim 18, wherein
the copper alloy cathode comprising 81% Cu, 12% Pb and about 7% Sn;
the aqueous electrolyte solution comprising 145 g/l KOH, 100 g/l GeO2 and DI water; and the divided tubular housing electrochemical cell is operated at 30° C.; and at a current density of 330 mA/cm$^2$.

20. The method of claim 18, further comprising steps of:
suspending the cathode in gas phase over the aqueous electrolyte solution; and
reinserting the cathode back to the aqueous electrolyte solution.

* * * * *